United States Patent [19]

van der Wal et al.

[11] Patent Number: 4,552,750
[45] Date of Patent: Nov. 12, 1985

[54] PROCESS FOR THE REACTION OF CARBON MONOXIDE WITH STEAM, WITH FORMATION OF CARBON DIOXIDE AND HYDROGEN AND USE OF A CATALYST FOR THIS PURPOSE

[75] Inventors: Willem J. J. van der Wal, Utrecht; John W. Geus, Bilthoven, both of Netherlands

[73] Assignee: VEG-Gasinstituut N.V., Apeldoorn, Netherlands

[21] Appl. No.: 517,852

[22] Filed: Jul. 27, 1983

[30] Foreign Application Priority Data

Jul. 30, 1982 [DE] Fed. Rep. of Germany ....... 3228482

[51] Int. Cl.$^4$ .............................................. C01B 2/10
[52] U.S. Cl. ..................... 423/656; 423/244; 502/34; 502/38; 502/258; 502/336; 502/338; 502/517
[58] Field of Search ............... 502/38, 51, 55, 517, 502/34, 258, 336, 338; 423/656, 244 R

[56] References Cited

U.S. PATENT DOCUMENTS

| | | | |
|---|---|---|---|
| 1,115,776 | 11/1914 | Bosch et al. | 423/656 |
| 2,368,507 | 1/1945 | Welty, Jr. | 502/38 |
| 3,055,824 | 9/1962 | Squires et al. | 502/38 |
| 3,899,577 | 8/1975 | Sugier | 423/656 |
| 4,124,629 | 11/1978 | Hansford | 423/656 |

FOREIGN PATENT DOCUMENTS 16631 10/1980 European Pat. Off. ........ 423/242 R

OTHER PUBLICATIONS

Pages 232 to 235, "Struktur und katalytische aktiuitat von Eisen-und Braunoxiden", from Chem. Techn., Apr. 4, 1967, by Kurt Laudien and Hans Witzmann.

Primary Examiner—H. T. Carter
Assistant Examiner—Wayne A. Langel
Attorney, Agent, or Firm—Mandeville and Schweitzer

[57] ABSTRACT

Process for the reaction of carbon monoxide with steam, with formation of carbon dioxide and hydrogen at elevated temperature in the presence of iron-containing catalysts (shift reaction), in which a catalyst is used, which contains finely divided iron oxide on an inert, thermostable carrier having a high specific surface.

14 Claims, 2 Drawing Figures

PROCESS FOR THE REACTION OF CARBON MONOXIDE WITH STEAM, WITH FORMATION OF CARBON DIOXIDE AND HYDROGEN AND USE OF A CATALYST FOR THIS PURPOSE

BACKGROUND OF THE INVENTION

Process for the reaction of carbon monoxide with steam, with formation of carbon dioxide and hydrogen and use of a catalyst for this purpose.

The present invention relates to a process for the reaction of carbon monoxide with steam, with formation of carbon dioxide and hydrogen at elevated temperature in the presence of iron oxide-containing catalysts.

The process described above is known as a shift reaction and is carried out on a large industrial scale. It is of particular importance in the gasification of coal and in the production of methanol and of ammonia. The state of the art concerning this reaction is described, inter alia, in an abstract in CATAL. REV. SCI. ENG., 21 (2), 275-318 (1980). The reaction is carried out in the presence of catalysts. There are essentially three types of catalysts. One type are those based on iron. These are the so-called high temperature shift catalysts, for which reaction temperatures of about 320° to 450° C. are required. Such catalysts can tolerate small quantities of sulphur in the reaction gas mixture. However, the sulphur content should not exceed about 50 ppm.

Another catalyst type for this reaction are the catalysts based on copper. These are so-called low temperature shift catalysts, which have the disadvantage of being very sensitive to sulphur impurities in the gas mixture. These catalysts are irreversibly poisoned by sulphur compounds. A further disadvantage lies in the fact that they are stable only up to relatively low temperatures. At temperatures above about 260° C., they sinter and lose their activity. Higher temperatures are however desirable for the shift reaction, because the reaction rate rises with increasing temperature. Furthermore in most cases, the low process temperature can only be maintained by the addition of excess steam, which is obviously disadvantageous.

The third type are the catalysts based on cobalt and molybdenum. They are largely insensitive to sulphur compounds. According to the above mentioned literature reference, page 280, the critical sulphur content lies below about 2000 ppm. They are effective at relatively low temperatures, but they have several disadvantages. Owing to their limited availability, they are expensive. The selectivity for the shift reaction is not very good. They catalyse the methanation reaction, which is sometimes undesirable. As a result, it is necessary to employ excess steam in the reactor feed, so as to keep the temperature within the tolerable range. Besides, a certain quantity of hydrogen sulphide has to be present in the feed gas mixture, since, otherwise, the methanation reaction is catalysed to an even larger extent.

SUMMARY OF THE INVENTION

The present invention is based on the problem of improving the shift process and, particularly, to carry it out in the presence of a catalyst that is nonsensitive to sulphur, possesses a good selectivity for the shift reaction and, in some cases, makes the use of low inlet temperatures feasible as well. (Inlet temperatures are taken to mean the temperature at the entrance of the reactor.) Moreover, the catalyst should be easily available and inexpensive.

It has now been surprisingly found that this aim can be met by carrying out the reaction by using the catalysts as defined hereinafter, which are essentially characterized by the fact that they contain the active iron component, which is present in the form of iron oxides, in very finely divided form on a carrier.

The subject of the invention is, accordingly, a process for the reaction of carbon monoxide with steam, with formation of carbon dioxide and hydrogen at elevated temperature in the presence of iron oxide-containing catalysts, characterised in that the catalyst contains finely divided iron oxide, and in that (a) the iron oxide is placed on an inert, thermostable carrier, which has a specific surface of more than 10 m$^2$ per gram; (b) the iron oxide is present on the carrier in a quantity of at least 5% by weight, calculated as elementary iron of the iron oxide and related to the weight of the carrier; and (c) at least 20% by weight of the iron oxide, present on the carrier, is in finely divided form with a particle size of less than 40 nm.

It is known from the literature, that pure iron oxide catalyses the CO-shift conversion reaction. However, this fact does not make iron oxide suitable as a shift catalyst. When iron oxide is placed in a reducing atmosphere at temperatures in excess of 250°–300° C., it is reduced to metallic iron (Int. J. Hydrogen Energy 7 (12) p. 951–955 (1982)) with subsequent formation of carbon and sintering of the material. To avoid such reduction, iron oxide type catalysts always contain chromium oxide. On the other hand, the reduceability of the iron oxide according to $Fe^{3+} \rightarrow Fe^{2+}$ is a necessary step in the CO-shift conversion mechanism as is described in the abovementioned literature reference, page 289, section C1, and in C.R. Acad. Sc. Paris, 287, series C, pages 557 to 559, particularly page 558, FIG. 1 (1978).

A requirement for a good shift catalystt based on iron oxide is therefore, that it is, over an appropriate temperature range, readily reduced from Fe(III) to Fe(II), but not to Fe(O).

It was now surprisingly found that these conditions are met by the catalyst of our invention.

A maybe even more surprising property of the catalyst of our invention is the fact that, even when it is loaded with sulphur, the activity for the CO-shift conversion reaction is hardly changed.

Therefore, it is very surprising, that the shift reaction can be carried out at relatively low inlet temperatures with high selectivity, when the catalysts, as defined in the specification, are used, and that the catalysts are non-sensitive to sulphur compounds in the feed gas mixture. On the contrary, these catalysts are even suitable for removing sulphur compounds, particularly $H_2S$, COS and $CS_2$, which are frequently present as impurity in the feed gases, from the gases. The process according to the invention can therefore be carried out in a particularly advantageous manner with those feed gas mixtures that have an average sulphur content of less than about 100 ppm, preferably less than about 80 ppm, most preferably less than 40 ppm. The content of sulphur compounds is based on the volume of the feed gas. According to the process of the invention, particularly according to this embodiment, it is possible for the sulphur content to be considerably higher for short periods, since the catalyst is non-sensitive to this. For short periods, it can be, for example, above 1000 ppm and even above 2000 ppm. The lower limit is not important but in many cases technical feed gases have a sulphur compounds content of more than 0.1 ppm or more than 10 ppm.

The sulphur compounds contained in the feed gas mixture are absorbed, completely or at least to a considerable extent, by the catalyst. If necessary two or more reactors may be used in series. Since, as a rule, reactors of relatively small spatial dimensions are employed for the shift reaction (for economy reasons), the amount of catalyst in such reactors is inevitably also restricted quantitatively. If feed gas mixtures, having very high sulphur contents, are used for the shift reaction, this would result in the catalyst being loaded with sulphur compounds in a relatively short time. In such a case, therefore, larger reactors with correspondingly larger quantities of catalysts would have to be employed, in order to avoid frequent regeneration.

According to another embodiment of the process according to the invention, therefore, the shift reaction can also be carried out with those feed gas mixtures that contain an average of about 100 ppm or more of sulphur compounds in the feed gas mixture. The quantity of sulphur compounds can be even above 200 ppm. Appropriately, the upper limit lies at about 6% by volume, preferably at about 4% by volume. Since, in such a case, considerable quantities of sulphur compounds are bound by the catalyst, as has already been explained, the quantity of catalyst and the reactor containing the catalyst have to be designed in such a size that a sufficiently long continuous operation can be carried on, before the catalyst has to be regenerated. Thus, it is possible, according to the invention, to employ gases for the shift reaction, which have not yet been submitted to a special desulphurisation reaction, as is generally necessary according to the state of the art.

A preferred embodiment of the invention is characterised in that by using at least 2 reactors in parallel at least one of which is regenerated with an oxidising gas, while at least one other is in operation, sulphur compounds are continuously removed from the feed gas by absorption in the reaction mass while simultaneous CO-shift conversion of the feed gas proceeds.

DETAILED DESCRIPTION OF THE INVENTION

Figure 1:
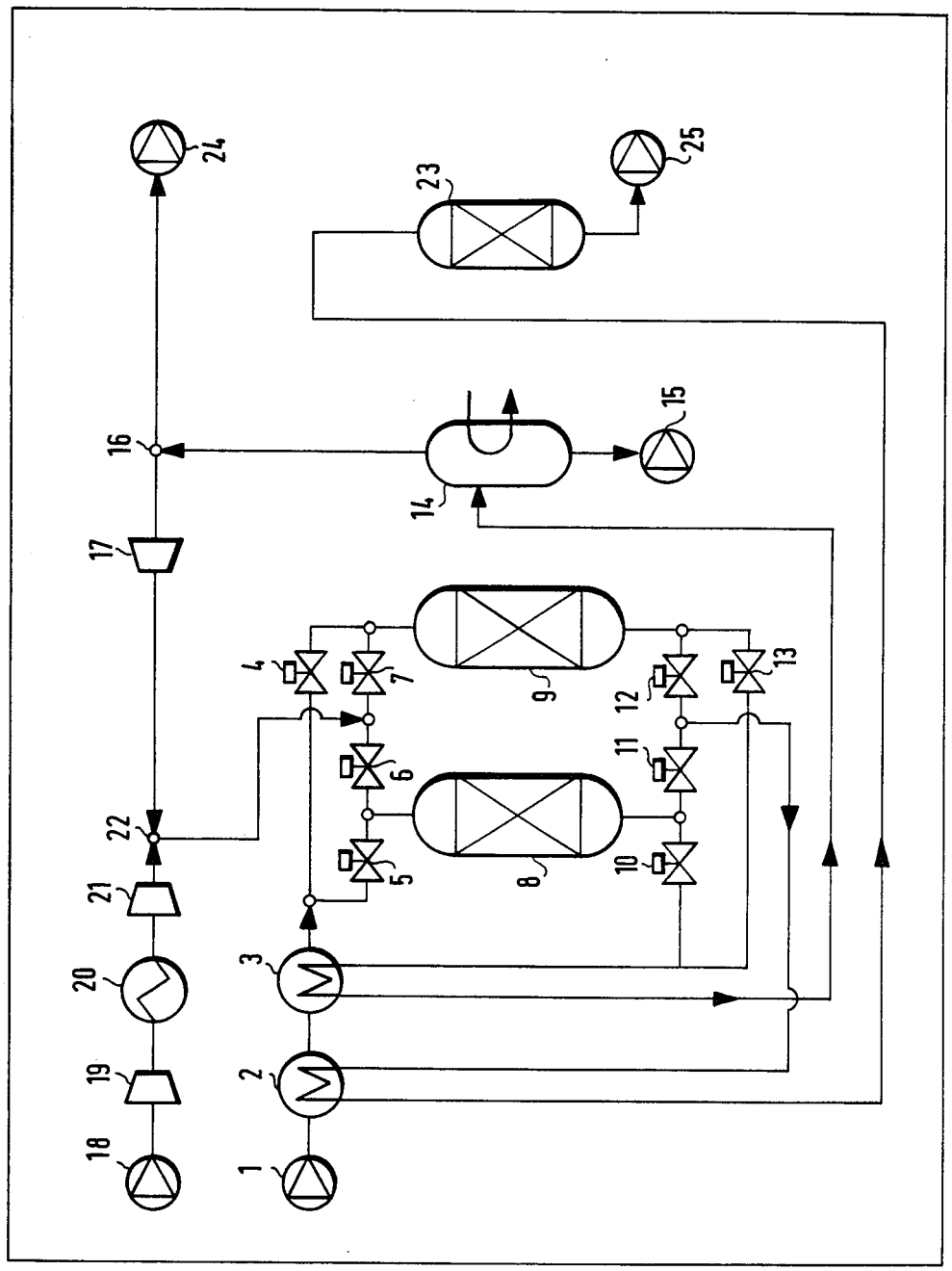
FIG. 1 is a schematic view of the process cycle.

If regeneration of the catalyst, which has been employed for the shift reaction according to the invention, is required, this can be effected, as a rule, with a gas stream containing less than 5% by volume of oxidising agent. In many cases, oxygen is used as oxidising agent, because it is most easily accessible. Sulphur dioxide and nitrogen oxides can however also be employed. Sulphur dioxide is preferred particularly when it is available for other reasons. The lower limit for the content of oxidising agent in the regenerating gas is not particularly critical; however, it must be sufficiently large for regeneration to be attained in an economically acceptable time. From this point of view, the lower limit for the oxidising agent is about 0.1% by volume, preferably 0.5% by volume, most preferably 1% by volume. The upper limit is appropriately 6% by volume, preferably 4% by volume, with preference for 2% by volume. The content of oxidising agent is used to control the regeneration process, for example temperature and velocity. As a rule, elementary sulphur is obtained during regeneration. This reaction takes place at temperatures from room temperature, that is to say about 20° C., up to about 800° C. If, at first, oxidation is carried out at temperatures below about 200° C., the sulphur is carried off by the gas stream only in a small proportion. It is then necessary to expel the sulphur at higher temperatures above about 200° C., to which the catalyst mass is heated, by means of an inert gas, such as nitrogen or carbon dioxide. The sulphur vapour is then subsequently condensed from the inert gas. If the oxidation is carried out at temperatures above about 200° C., the elementary sulphur formed is carried off from the catalyst mass with the gas stream. All that has to be ensured is that the oxidation temperature and the quantity of oxidising agent in the gas stream used for the regeneration are adjusted to each other in such a way that further oxidation to sulphur dioxide is avoided. It must therefore be ensured, especially at the end of the regeneration step, that the oxygen content, (oxygen is preferred as the oxidising agent), lies below about 0.5% by volume, if the temperature of the catalyst mass lies above about 400° C. At a temperature of the catalyst mass of about 200° C., the oxygen content can be, for example, about 1% by volume. It is possible, by means of a few experiments, to ascertain the suitable temperature range and oxygen content at the end of the regeneration step, where undesirable oxidation to sulphur dioxide is avoided, if it is desired to obtain only sulphur as the reaction product.

According to the invention, it is possible to obtain a final gas mixture, that is to say a reaction product, that is virtually completely free from sulphur compounds, for example below 5 ppm, or even below 1 ppm. Two or more reactors can be placed in series for carrying out the shift reaction.

Many compounds can be employed, according to the invention, as inert, thermostable carrier for the catalysts, as long as they have a large specific surface. The products known from the state of the art, such as aluminium oxide, silicon dioxide, silicon dioxide/aluminium oxide, silicon dioxide/magnesium oxide, zirconium dioxide, silicon dioxide/zirconium dioxide, titanium oxide, silicon dioxide/zirconium dioxide/titanium dioxide, crystalline or amorphous aluminium silicate molecular sieves and metal phosphates, can be used.

It is preferred that at least 20% by weight of the iron oxide, present on the carrier, have a particle size of less than 20 nm. Appropriately, at least 40% by weight, preferably at least 50% by weight of the iron oxide are present on the carrier in finely divided form. It is particularly preferred for the quantity mentioned to be present in a particle size of under 15 nm, and even more particularly preferred in a particle size of under 10 nm, since the course of absorption and regeneration is then rapid and complete. The lower limit for the particle size is not particularly important and lies around 1 nm, preferably around 3 nm. If the particle size of the iron oxide is lower than that, a far-reaching reaction can take place with the oxide-type carrier. For example, iron hydrosilicate may be formed with silicon dioxide and ferrous aluminate may be formed with aluminium oxide. These compounds, formed with the oxide-type carriers, as a rule, do not react with hydrogen sulphide as well as iron oxide and their formation should be avoided. Therefore, the particle size of the iron oxide should be above about 1 nm, depending on the type of the carrier and of the preparation procedure. Since, for example, ferric iron reacts less readily with silicon dioxide than does ferrous iron, the particle size of ferric (hydr)oxide particles can be lower. The lower limit for the particle size, therefore, depends on the nature of the iron oxide/carrier combination and can be easily ascertained. The catalysts used according to the invention are known per se, but they have not been employed so far for the shift reaction, because, as has been explained above, it had to be assumed that they were unsuitable for this purpose. They can be prepared, for example, by the following methods:

METHOD A

Co-precipitation of a precursor of the active material and the carrier.

As a rule, products are obtained which have to be decomposed at elevated temperatures, the carrier substance and the active iron oxide being formed. Appropriately, co-precipitation of the active precursor is carried out in the form of oxalates or formates with magnesium oxalate or formate. The oxalates are decomposed at temperatures below 500° C., finely divided iron oxide on magnesium oxide as the carrier being obtained. This method is described in detail by W. Langenbeck, H. Dreyer and D. Nehring, *Naturwissenschaften*, 41 (1954), 332; W. Langenbeck, H. Dreyer and D. Nehring and J. Welter, *Zeitschrift anorg. allgem. Chem.*, 281 (1955), 90.

METHOD B

This is the method described in DE-C- No. 1,767,202, in which precursors of the active components are precipitated in extremely finely divided state on the suspended carrier. As has already been explained above, it is difficult or impossible to obtain ferric iron precipitates by this method. On the other hand, precipitation of ferrrous iron yields excellent catalysts for use in the process according to the invention, if they are first reduced to metallic iron at a temperature of 600° to 700° C. in a hydrogen-containing atmosphere and subsequently reoxidized with diluted air at about 500° C.

METHOD C

This is a method for the preparation of a ferric oxide catalyst, in which iron is precipitated from an iron salt solution by means of hydroxyl ions in the presence of a carrier, the loaded carrier is dried and, if appropriate, calcined, a solution of a ferric salt being introduced into the suspension of the carrier with vigorous stirring under the surface of the suspension, the pH-value of the suspension is maintained between 4 and 7 and the loaded carrier is separated from the solution. Preferably, the pH-value of the suspension is kept between 5.5 and 6.5. It is preferred, furthermore, that hydroxyl ions, which are required for the precipitation of the possibly hydrated iron oxide, are continuously generated in the suspension by a chemical reaction that is known per se. According to a further preferred embodiment, the procedure is to measure the pH-value of the suspension continuously and to control the feed of the ferric salt solution and, if appropriate, of the alkali metal solution by means of regulator and adjustment members in such a way that the pH-value of the suspension is maintained within the desired range. This method is described in detail in DE-A-No. 3.1 31 255.

The process according to the invention has the further advantage that it can be operated at relatively low inlet temperatures of the reactor. Whereas the known iron-containing catalysts for the shift reaction require temperatures of about 320° to 450° C., as has already been explained above, temperatures of the reaction mixture at the beginning of the reactor of below about 300° C. suffice for the process according to the invention. It is known that, due to the exothermic reaction, the temperature in the reactor rises progressively with the displacement along the reactor. Overall, however, due to the lower inlet temperature, the exit temperature can be maintained lower than with the use of known iron catalysts. This is a remarkable advantage, since, at higher temperatures, the equilibrium is shifted unfavourably for the shift reaction. Thus, according to the invention smaller quantities of steam are required in the feed gas mixture, and the temperature and pressures of the steam for the feed gas mixture can be lower, which is more economical. Most preferably, the inlet temperature lies below about 270° C., most preferably below about 250° C. For achieving satisfactory conversion for industrial purposes, the inlet temperature should lie above 140° C., preferably above 170° and most preferably above 200° C. Due to the exothermic reaction, the temperature rises in the reactor up to about 50° to 200° C. above the inlet temperature. The temperature that is desired after consideration of all circumstances is known to those skilled in the art. It can be controlled by the feed of the feed gas mixtures, particularly the steam content.

As is known from the state of the art, the shift reaction according to the invention can be carried out at normal pressure or elevated pressure up to about 80 bar. However, the pressure is not particularly critical, as according to the state of the art. The advantage of the application of elevated pressure is essentially that reactors with relatively small dimensions can be used.

The catalyst used according to the invention does not favour the methanation reaction, as is the case on using the known cobalt/molybdenum catalysts. On using these known catalysts, the methanation reaction is favoured, especially at high pressures, which leads to increases in temperature, due to the exothermic reaction of the methanation. In order to avoid this, additional quantities of steam should be fed in, so as to maintain the temperature within the desired range in the reactor.

As has already been explained above, the equilibrium is increasingly shifted unfavourably to the shift reaction at high temperatures. The process according to the invention does not have these disadvantages.

The term "iron oxide", which is present in finely divided form on the carrier, is meant to include, within the meaning of the present invention, hydrated oxides or hydrosilicates, which may be formed, depending on the temperature of preparation and the steam pressure, as is known to those skilled in the art. For example, the iron may be present as $FeOOH$, $Fe_3O_4$ or $Fe_2O_3$. The absorptive capacity is not impaired by an, in particular, low moisture content. After preparation, the catalysts can be dried in the usual way, optionally calcined, appropriately at temperatures of 200° C. to 800° C., preferably of 300° C. to 500° C.

The invention is illustrated by means of the following examples, without limiting them thereto.

Preparation of the catalysts

PREPARATION EXAMPLE I (Method A)

0.6 kg of $MgCl_2$ and 0.14 kg of $Fe_2Cl_2$ were dissolved in 60 liters of deionised water. Separately, 0.51 kg of $(NH_4)_2C_2O_4.H_2O$ was dissolved in 30 liters of deionised water at 50° C. The ammonium oxalate solution was added to the stirred solution of magnesium chloride and iron chloride. The mixture obtained was stirred at room temperature for 42 hours. Subsequently, the precipitated solid was filtered off and washed with cold water. The washed, faintly yellow material was dried in vacuo at 40° C. for 48 hours. The dried material was placed in a rotating calcining oven and decomposed in an air stream at 400° C. After decomposition, the powder was pelleted. The ratio of iron to magnesium oxide was 1:4. The iron content was 20% by weight.

The X-ray diffraction pattern of the decomposed material showed relatively sharp diffraction peaks for magnesium oxide and markedly widened bands for ferric oxide. A sample was comminuted in ethanol with ultrasonic energy and study of a drop of this despersion on a carbon film under the transmission electron microscope showed that the particles had a diameter of about 10 nm and were uniformly distributed within the carrier.

PREPARATION EXAMPLE II (Method B)

An absorption mass was prepared, using ferrous iron, by the method of DE-C-No. 1,767,202. 1.1 kg of iron powder (ferrum reductum) were dispersed in 2.4 liters of deionised, oxygen-free water. 2.4 liters of concentrated hydrochloric acid (38% by weight of HCl) were then added. After 12 hours, only a small quantity of metallic iron was left, so as to prevent the formation of ferric iron.

0.8 kg of ureas was dissolved in 80 liters of water. 0.4 kg of finely divided silicon dioxide (AEROSIL, registered trade-mark), having a specific surface of 380 m²/g was suspended in the solution. The solution was heated in a nitrogen atmosphere at 90° C. for 30 minutes, so as to remove dissolved oxygen. The pH-value of the suspension was adjusted to 2.0 by addition of hydrochloric acid. The suspension was then cooled in a nitrogen atmosphere to 25° C. and 1.8 liters of the above ferrous chloride solution, containing 0.4 kg of iron, were added. The temperature was then raised to 90° C. The pH-value of the suspension rose to 5.8 within 30 minutes. It then fell to 5.3 and stayed at that level for 24 hours. It then rose to 7. The colour of the charged carrier was white. The ferrous iron had been precipitated completely on the carrier.

The ferrous iron was oxidised during the filtration of the charged carrier, which had the effect that the charged carrier assumed a bluish-green colour. It was washed with water and dried at 120° C. for 24 hours.

The dried material had a reddish colour. The ratio of iron to silicon dioxide was 1:1. The iron content was 50% by weight.

The X-ray diffraction pattern of the dried material showed only a few wide bands, which did not correspond to the peak bands of iron oxide. A study of the material, dispersed with ultrasonic energy, on a carbon film under the electron microscope showed the presence of very small, thin flakes. The thickness of the bent ferrous hydrosilicate flakes was about 2 nm, its lateral dimension about 20 nm. The specific surface of the silicon dioxide had increased from 380 m²/g to 500 m²/g, which proves that the silicon dioxide had been attacked by the ferrous ions.

The iron in the mass can be reduced to ferrous iron by means of a hydrogen stream at 400° C. For carrying out a reduction to metallic iron, the mass has to be heated to temperatures above 800° C.

PREPARATION EXAMPLE III (Method C)

Thy hydroxyl ions for the precipitation of the hydrated oxide were formed by hydrolysis of KCNO according to the following equation:

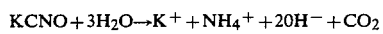

$$KCNO + 3H_2O \rightarrow K^+ + NH_4^+ + 2OH^- + CO_2$$

This reaction proceeds sufficiently rapidly already at 35° C. The formation of bubbles in the injection tube has to be avoided. Bubble formation, however, does not occur at the temperature mentioned.

0.8 kg of KCNO was dissolved in 60 liters of deionised water. 0.4 kg of finely divided silicon dioxide (AEROSIL, registered trade-mark), having a specific surface of 380 m²/g, was then suspended in the solution. The temperature was raised to 38° C. 20 liters of deionised water, in which 0.4 kg of $Fe(NO_3)_3.9H_2O$ had been dissolved, were then introduced under the surface of the vigorously stirred suspension through two injection tubes. The injection of these 20 liters of solution took 26 hours. The pH-value remained within the range of 5.7 to 6.2 during the injection.

The light-brown charged carrier settled rapidly. It was separated from the liquid by decanting, washed with water and dried at 120° C. for 24 hours. The ratio of iron to silicon dioxide was 1:4. The iron content was 20% by weight.

The X-ray diffraction pattern of the dried material showed markedly widened bands in the position of α-FeOOH. Moisture is lost on heating to 800° C.

The finely divided ferric oxide, thus heated, reacted with atmospheric moisture at room temperature, with formation of α-FeOOH. The treatment at 800° C. has sharpened markedly the X-ray diffraction peaks.

Under the transmission electron microscope, very small iron oxide particles are observed, which are distributed very uniformly across the surface of the carrier substance. The diameter of the particles was about 4 nm.

The ferric iron can be reduced on the charged carrier to ferrous iron at 400° C. by means of a hydrogen gas stream. If the charged carrier is treated with a hydrogen gas stream at 600° C. for 48 hours, no metallic iron is obtained. No appreciable reduction to metallic iron could be observed even at 800° C.

EXAMPLE 1

The catalyst obtained according to Preparation example III is used. 4.3 ml of catalyst are filled into a cylindrical reactor, having an internal diameter of 1 cm. A gas mixture, consisting of 0.5% by volume of carbon monoxide, 2.5% by volume of steam and the remainder nitrogen, is passed through the catalyst bed at a space velocity of 200 per hour. The conversion of CO to $CO_2$ is measured. The reaction rate constants, ascertained at different temperatures, are listed in the following table:

TABLE 1

| No. | Temperature °C. | Reaction rate constant (sec.$^{-1}$) |
|---|---|---|
| 1 | 25 | $1.9 \times 10^{-5}$ |
| 2 | 250 | $1.9 \times 10^{-2}$ |
| 3 | 290 | $2.9 \times 10^{-2}$ |
| 4 | 340 | $4.9 \times 10^{-2}$ |
| 5 | 390 | $8.8 \times 10^{-2}$ |
| 6 | 535 | $74.0 \times 10^{-2}$ |

The experiment was conducted for more than 500 hours, without measurable deactivation of the catalyst. The shift conversion selectivity remained 100%.

EXAMPLE 2

The procedure is essentially as described in Example 1, 3.8 ml of the catalyst, obtained according to Preparation example III, being used. The gas mixture contained 0.5% by volume of CO, 2.0% by volume of $H_2$, 2.0% by volume of steam and the remainder nitrogen. Again, the following Table 2 gives the reaction rate constants, ascertained at different temperatures.

TABLE 2

| No. | Temperature °C. | Reaction rate constant (sec.$^{-1}$) |
|---|---|---|
| 1 | 300 | $1.16 \times 10^{-2}$ |
| 2 | 325 | $1.82 \times 10^{-2}$ |
| 3 | 350 | $2.48 \times 10^{-2}$ |
| 4 | 375 | $4.20 \times 10^{-2}$ |
| 5 | 400 | $7.12 \times 10^{-2}$ |
| 6 | 425 | $11.69 \times 10^{-2}$ |
| 7 | 450 | $16.30 \times 10^{-2}$ |

The experiment was conducted for more than 500 hours, at constant catalyst activity and selectivity, as in example 1.

EXAMPLE 3

In this example the shift activity as well as the $H_2S$ activity was tested. 2 cm$^3$ of an 50% w/e $Fe_2O_3$ on $SiO_2$ catalyst prepared according to Preparation Method C was placed in a cylindrical quartz reactor of 1 cm diameter. A gas mixture containing 1% $H_2S$, 15% $H_2$, 10% CO, 2% $H_2O$ and balance nitrogen was led over the catalyst at 500° C. with a space velocity of 1500 hr$^{-1}$.

The first trace of hydrogen sulfide was recorded 75 minutes after the start of the experiment. The $H_2S$ concentration in the exit gas rose steeply and total breakthrough was reached 90 minutes after the start of the run. The steep breakthrough curve indicated a high reaction rate of absorption of hydrogen sulfide.

The concentration of $CO_2$ in the exit gas of the reactor rose slowly after the start of the run, apart from an initial $CO_2$ peak in the first 15 minutes of the run due to reduction of the absorbent mass by CO in the gas, reaching a steady state concentration 60 minutes after the start of the run. The steady state conversion was about 15% which is the thermodynamical equilibrium value for the shift at that temperature and gascomposition. After $H_2S$ breakthrough the $CO_2$ concentration remained 15%. During the run only CO, $H_2$, $CO_2$, $H_2S$ and water were recorded in the exit gas of the reactor. No methane or any other hydro-carbon was observed.

The sulphur to iron ratio of the sorbent at total breakthrough was 0.5. The presence of steam in the feed gas did not influence the $H_2S$ absorption. Prior to breakthrough the $H_2S$ content of the exit gas was lower than 0.1 ppm.

Regeneration of the absorbent mass was effected at 400° C. by a gas stream containing 0.5% oxygen balanced with nitrogen. Only elemental sulphur was produced during regeneration. After the regeneration run the sorbent was as active in the $H_2S$ absorption and the water-gas shift reaction as before. After ten absorption and regeneration runs no loss of activity was observed.

EXAMPLE 4

This example illustrates the simultaneous desulphurisation and shift reaction of a scrubbed coal gas. Untreated coal gas containing sulphur compounds is cooled by a waste heat boiler in which high-pressure steam is generated. It is then passed through a water scrubber to remove solid particles. The gas leaving the scrubber has composition C1 in Table 3.

FIG. 1 is a schematic view of the process cycle. The gas is supplied via pipe 1 through several heat exchangers 2 and 3 to the reactor 8 via a valve system 4, 5, 6, 7. The reactor 8 is filled with the catalyst of example 3. The gas enters the reactor 8 with a temperature of 400° C. In the reactor 8 the following reactions take place:

COS and $CS_2$ are hydrolysed, forming $H_2S$. CO is converted with the steam contained in the gas to $H_2$ and $CO_2$. $H_2S$ is absorbed by the catalyst forming iron sulphide.

The gas leaving the reactor 8 then has composition C2 of Table 3. This gas leaves the reactor 8 with a temperature of 521° C. This temperature increase is essentially to be attributed to the CO shift reaction, which in this reactor comprises 24.4%. The gas leaving the reactor 8 again passes through a valve system 10, 11, 12, 13 and then into a guard reactor 23, by which it is ensured that the gas purified therein 25 contains no significant quantities of sulphur compounds. This guard reactor can in most cases be fairly small. Its size may e.g. comprise one fifth to one tenth of the size of reactor 8.

The gas leaving the guard reactor 23 at 25 has composition C3 in Table 3. The gas entering the guard reactor 23 is continuously tested for its composition in particular with respect to the presence of sulphur compounds. When these measurements show that the sulphur compounds are "breaking through" the reactor 8, the gas stream is passed from heat exchanger 3 into reactor 9 by appropriate switching of the control valves 4, 5, 6, 7, 10, 11, 12, 13. Reactor 9 has essentially the same dimensions as reactor 8 and is filled with the same catalyst.

Then reactor 8 is regenerated. For this, at 18 first nitrogen of normal pressure or elevated pressure is introduces into the system and compressed in two stages 19 and 21 to 22 bars with intermediate cooling. Reactor 8 is purged with the compressed nitrogen to ensure that no reducing gases are present in reactor 8 and the adjoining pipes. After purging, the nitrogen is returned to the mixing point 22 by means of the circuit compressor 17, while the fresh nitrogen stream is stopped at 18. Now air is introduced at 18 in increasing quantity, while the gas stream is split up at 16 in such a way that the total gas stream in the circuit system is kept constant. The quantity of air supplied at 18 is controlled so that oxygen content at the entrance to reactor 8 is between 2 and 6 vol.%. By this means a reasonable and acceptable temperature increase during regeneration is ensured. The gas leaving reactor 8 after regeneration has a temperature between 500° and 550° C. This gas contains elementary sulphur in the gas phase. The sulphur is separated from the gas stream in the sulphur condenser 14 at a temperature of 150° C. The gas leaving the sulphur condenser is partly returned to the circuit via 16 and 17 and partly let off, burnt off and/or further processed at 24. At 15, liquid sulphur is drawn off from the sulphur condenser.

The gas leaving the guard reactor 25 is suitable for methanol production or SNG production if a so-called "direct methanation method" is employed. For this, removal of $CO_2$ may be necessary at some stage, e.g. using the so-called Benfield process, in the event that this should be necessary. (SNG means substitute natural gas).

TABLE 3

| | Composition in kilomoles | | |
|---|---|---|---|
| | C1 | C2 | C3 |
| $H_2$ | 14.73 | 18.95 | 21.89 |
| CO | 20.09 | 15.18 | 12.24 |
| $CH_4$ | 1.12 | 1.12 | 1.12 |
| $CO_2$ | 6.70 | 11.87 | 14.82 |
| $H_2O$ | 6.81 | 3.33 | .39 |
| $N_2$ | .89 | .89 | .89 |
| $H_2S$ | .85 | 14.5 ppm | .1 ppm |
| COS | .22 | 2.9 ppm | .03 ppm |
| $CS_2$ | .05 | 0 | 0 |
| P(bars) | 19 | 17.5 | 17.0 |
| T(°C.) | 400 | 521 | 267 |

EXAMPLE 5

This example illustrates desulphurisation and CO shift conversion when it is carried out in separate reactors.

Figure 2:
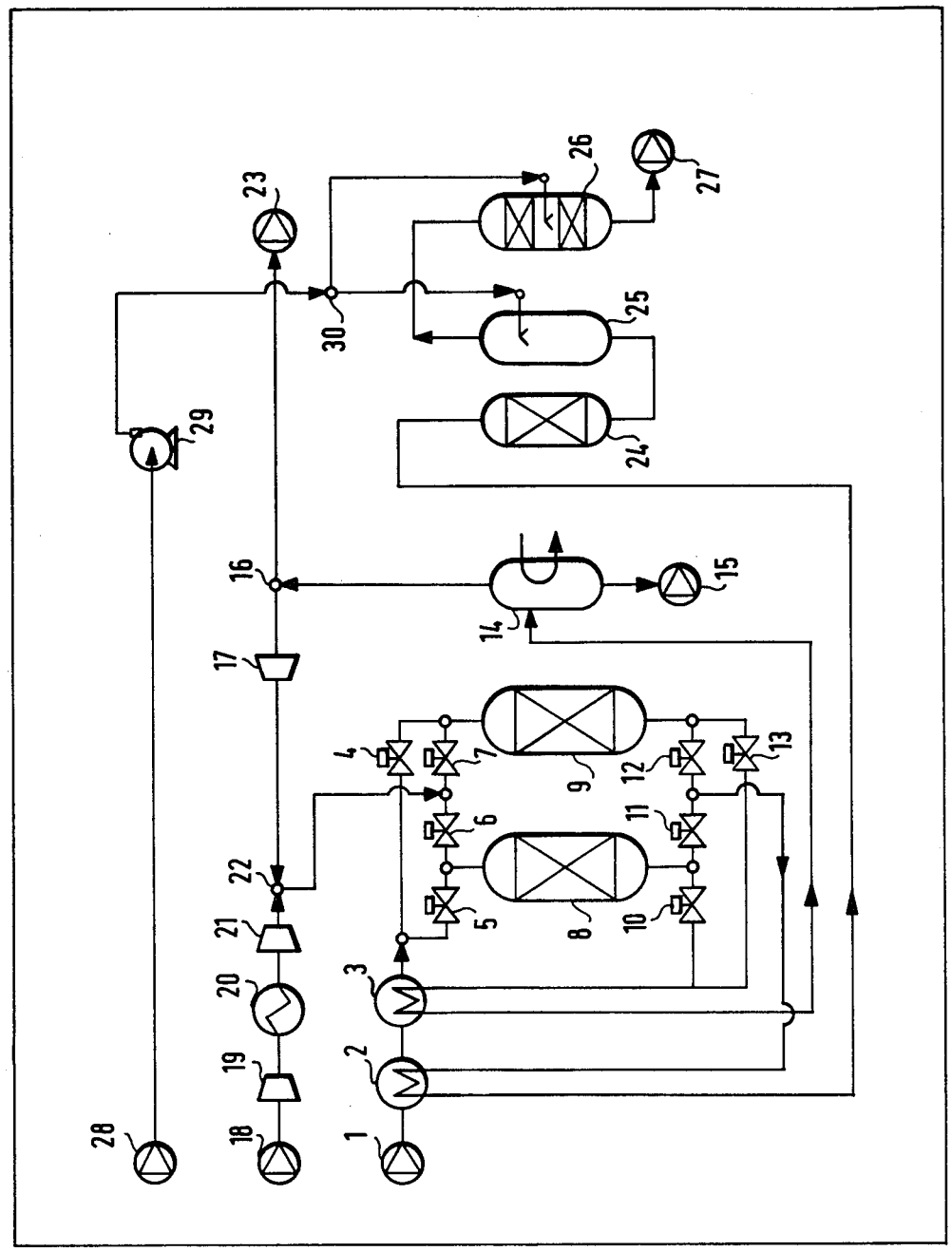
FIG. 2 is a schematic view of a more flexible operation of the process cycle.

One disadvantage of the method described in example 4, which is possible in many cases, may lie in a low CO conversion. This disadvantage can be avoided if operation is more flexible according to the process cycle shown schematically in FIG. 2.

The process for purification of the gas and regeneration of the catalyst is described similarly to example 4. The untreated coal gas which enters reactor 8 has composition C1 in Table 4. As this gas had not been treated in a water scrubber, it contains no water. The dust particles were removed by a dry method. The gas leaving the reactor 8 has composition C2 in Table 4. After the guard reactor 24, the gas has composition C3 in Table 4. This gas is then quenched with water 28 in vessel 25 and then passed into the shift reactor 26, where the same catalyst as is used in reactors 8 and 9 acts as shift catalyst. The shift reaction is carried out as a two-stage process with intermediate quenching in the shift reactor.

The gas entering reactor 26 has composition C4 in Table 4. After the reaction in the first catalyst bed, the gas has composition C5 in Table 4. On entering the second catalyst bed, the gas has composition C6 in Table 4. The product gas 27 has composition C7 in Table 4. This gas is eminently suitable for "classic" methanation after removal of excess $CO_2$ e.g. by a Benfield process.

TABLE 4

| | Composition in kilomoles | | | | | | |
|---|---|---|---|---|---|---|---|
| | C1 | C2 | C3 | C4 | C5 | C6 | C7 |
| $H_2$ | 14.42 | 14.81 | 15.09 | 15.09 | 20.05 | 20.05 | 26.06 |
| CO | 19.73 | 18.65 | 18.37 | 18.37 | 13.41 | 13.41 | 7.40 |
| $CH_4$ | 1.12 | 1.12 | 1.12 | 1.12 | 1.12 | 1.12 | 1.12 |
| $CO_2$ | 6.47 | 7.83 | 8.11 | 8.11 | 13.07 | 13.07 | 19.08 |
| $H_2O$ | .85 | 1.19 | .91 | 6.70 | 1.74 | 9.36 | 3.35 |
| $N_2$ | .89 | .89 | .89 | .89 | .89 | .89 | .89 |
| $H_2S$ | .85 | 3.7 ppm | 2.0 ppm | 1.8 ppm | 1.8 ppm | 1.5 ppm | 1.5 ppm |
| COS | .22 | 1.2 ppm | 0.7 ppm | 0.6 ppm | 0.6 ppm | 0.5 ppm | 0.5 ppm |
| $CS_2$ | .05 | 0.0 ppm | 0.0 ppm | 0.0 ppm | 0.0 ppm | 0.0 ppm | 0.0 ppm |
| T(°C.) | 450 | 499 | 457 | 300 | 410 | 240 | 356 |

One disadvantage of the result apparent from Table 4 is a relatively high sulphur content in the product gas. This can be reduced by cooling the gas entering the guard reactor 24 to a lower temperature. Table 4 relates to the case where this temperature is 450° C. If this temperature is lowered to 400° C., while the inlet temperatures in both catalyst beds of the shift reactor 26 are kept at about 240° C., the results compiled in Table 5 are obtained. If the temperature at the inlet of the guard reactor is lowered still further to 350° C. under otherwise identical conditions, the result compiled in Table 6 are obtained.

TABLE 5

| | Composition in kilomoles | | | | | | |
|---|---|---|---|---|---|---|---|
| | C1 | C2 | C3 | C4 | C5 | C6 | C7 |
| $H_2$ | 14.42 | 14.81 | 15.35 | 15.35 | 21.22 | 21.22 | 26.05 |
| CO | 19.73 | 18.65 | 18.11 | 18.11 | 12.24 | 12.24 | 7.41 |
| $CH_4$ | 1.12 | 1.12 | 1.12 | 1.12 | 1.12 | 1.12 | 1.12 |
| $CO_2$ | 6.47 | 7.83 | 8.36 | 8.36 | 14.23 | 14.23 | 19.06 |
| $H_2O$ | .85 | 1.19 | .65 | 7.32 | 1.46 | 7.42 | 2.59 |
| $N_2$ | .89 | .89 | .89 | .89 | .89 | .89 | .89 |
| $H_2S$ | .85 | 3.7 ppm | 0.9 ppm | 0.8 ppm | 0.8 ppm | 0.7 ppm | 0.7 ppm |
| COS | .22 | 1.2 ppm | 0.3 ppm | 0.3 ppm | 0.3 ppm | 0.3 ppm | 0.3 ppm |
| $CS_2$ | .05 | 0.0 ppm | 0.0 ppm | 0.0 ppm | 0.0 ppm | 0.0 ppm | 0.0 ppm |
| T(°C.) | 450 | 499 | 413 | 240 | 371 | 240 | 335 |

TABLE 6

| | C1 | C2 | | C3 | | C4 | | C5 | | C6 | | C7 | |
|---|---|---|---|---|---|---|---|---|---|---|---|---|---|
| | | | | | | Composition in kilomoles | | | | | | | |
| $H_2$ | 14.42 | 14.81 | | 15.57 | | 15.57 | | 20.09 | | 20.09 | | 24.08 | |
| CO | 19.73 | 18.65 | | 17.89 | | 17.89 | | 13.37 | | 13.37 | | 9.38 | |
| $CH_4$ | 1.12 | 1.12 | | 1.12 | | 1.12 | | 1.12 | | 1.12 | | 1.12 | |
| $CO_2$ | 6.47 | 7.83 | | 8.58 | | 8.58 | | 13.10 | | 13.10 | | 17.09 | |
| $H_2O$ | .85 | 1.19 | | .44 | | 5.38 | | .86 | | 5.46 | | 1.47 | |
| $N_2$ | .89 | .89 | | .89 | | .89 | | .89 | | .89 | | .89 | |
| $H_2S$ | .85 | 3.7 | ppm | 0.4 | ppm | 0.4 | ppm | 0.4 | ppm | 0.3 | ppm | 0.3 | ppm |
| COS | .22 | 1.2 | ppm | 0.1 | ppm | 0.1 | ppm | 0.1 | ppm | 0.1 | ppm | 0.1 | ppm |
| $CS_2$ | .05 | 0.0 | ppm | 0.0 | ppm | 0.0 | ppm | 0.0 | ppm | 0.0 | ppm | 0.0 | ppm |
| T(°C.) | 450 | 499 | | 370 | | 240 | | 345 | | 240 | | 323 | |

We claim:

1. A process for conducting the shift reaction which comprises reacting carbon monoxide with steam to form carbon dioxide and hydrogen at elevated temperature in the presence of a catalyst which consists essentially of iron oxide placed on an inert thermostable carrier having a specific surface of more than 10 $m^2$ per gram, the iron oxide being present on the carrier in a quantity of at least 5% by weight calculated as elementary iron of the iron oxide and related to the weight of the carrier, and at least 20% by weight of the iron oxide present on the carrier being in finely divided form with a particle size of less than 40 nm.

2. Process according to claim 1, characterised in that at least 20% by weight of the iron oxide, present on the carrier, have a particle size of less than 20 nm.

3. Process according to claim 1 or 2, characterised in that at least 50% by weight of the iron oxide, present on the carrier, is in finely divided form.

4. Process according to claim 1 or 2, characterised in that the temperature of the reaction mixture at the beginning of the reactor lies below about 300° C.

5. Process according to claim 1 or 2, characterised in that the feed gas mixture contains sulphur compounds in quantities of less than 100 ppm based on the volume of the feed gas.

6. Process according to claim 1 or 2, characterised in that by using at least 2 reactors in parallel at least one of which is regenerated with an oxidising gas, while at least one other is in operation, sulphur compounds are continuously removed from the feed gas by absorption in the reaction mass while simultaneous CO-shift conversion of the feed gas proceeds.

7. Process according to claim 6, characterised in that sulphur compounds are present in the feed gas mixture in an amount of less than 4% by volume.

8. Process according to claim 1 or 2, characterized in that at least 50% by weight of the iron oxide, present on the carrier, is in finely divided form and the temperature of the reaction mixture at the beginning of thereactor lies below about 300° C.

9. Process according to claim 1 or 2, characterized in that (a) at least 50% by weight of the iron oxide, present on the carrier, is in finely divided form, and (b) the feed gas mixture contains sulphur compounds, in quantities of less than 100 ppm based on the volume of the feed gas.

10. Process according to claim 1 or 2, characterized in that (a) at least 50% by weight of the iron oxide, present on the carrier, is in finely divided form, (b) the temperature of the reaction mixture at the beginning of the reactor lies below about 300° C., (c) the feed gas mixture contains sulphur compounds, in quantities of less than 100 ppm based on the volume of the feed gas, and (d) by using at least two reactors in parallel at least one of which is regenerated with an oxidizing gas, while at least one other is in operation, sulphur compounds are continuously removed from the feed gas by absorption in the reaction mass while simultaneous CO-shift conversion of the feed gas proceeds.

11. The process according to claim 9, wherein the sulfur compounds are selected from the group consisting of hydrogen sulfide, carbon oxysulfide and carbon disulfide.

12. The process according to claim 10, wherein the sulfur compounds are selected from the group consisting of hydrogen sulfide, carbon oxysulfide and carbon disulfide.

13. The process according to claim 5, wherein the sulfur compounds are selected from the group consisting of hydrogen sulfide, carbon oxysulfide and carbon disulfide.

14. A process for conducting the shift reaction and simultaneously removing sulfur compounds from the reaction gases, which comprises reacting carbon monoxide with steam to form carbon dioxide and hydrogen at elevated temperature in the presence of a catalyst which consists essentially of iron oxide placed on an inert thermostable carrier having a specific surface of more than 10 $m^2$ per gram, the iron oxide being present on the carrier in a quantity of at least 5% by weight calculated as elementary iron of the iron oxide and related to the weight of the carrier, and at least 20% by weight of the iron oxide present on the carrier being in finely divided form with a particle size of less than 40 nm, sulfur compounds being removed from the reaction gases simultaneously.

* * * * *